UNITED STATES PATENT OFFICE.

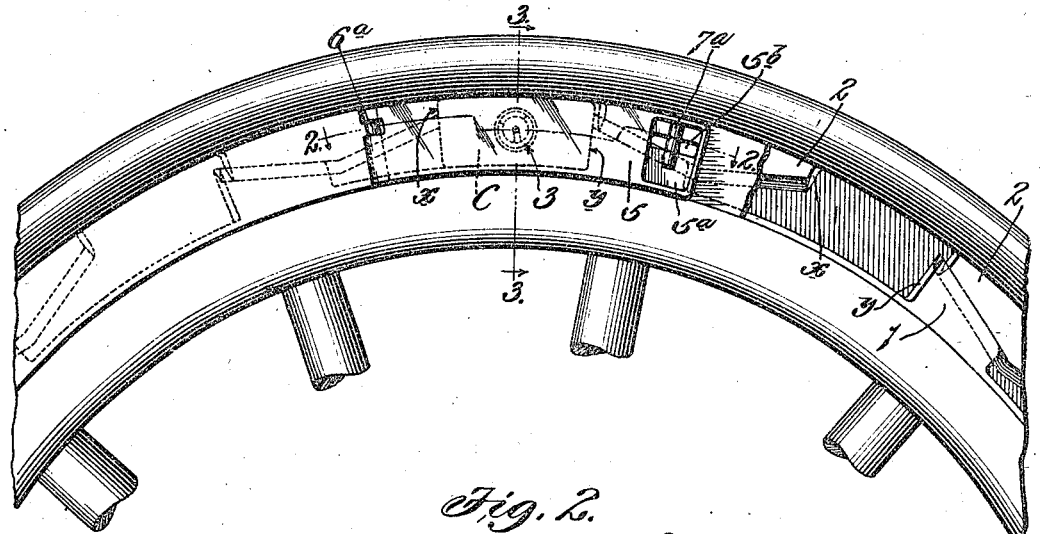

NICHOLAS SCHENK, OF ST. LOUIS, MISSOURI.

DEMOUNTABLE RIM FOR VEHICLE-WHEELS.

1,173,222.  Specification of Letters Patent.  Patented Feb. 29, 1916.

Application filed May 10, 1915. Serial No. 27,086.

*To all whom it may concern:*

Be it known that I, NICHOLAS SCHENK, a citizen of the United States, residing at St. Louis, Missouri, have invented a certain new and useful Improvement in Demountable Rims for Vehicle-Wheels, of which the following is a full, clear, and exact description, such as will enable others skilled in the art to which it appertains to make and use the same.

This invention relates to demountable rims for vehicle wheels of the type described in my prior Patent No. 1,128,531, dated February 16, 1915, which is provided with means for locking the demountable rim in operative position on the fixed rim and for automatically taking up any slight circumferential play that develops between said rims.

The object of my present invention is to provide a means of novel construction for locking the demountable rim in operative position and for automatically taking up or compensating for any slight circumferential movement or stretching of said rim, said means consisting of a rugged, spring-actuated member of substantially block form that is arranged horizontally between the fixed rim and the demountable rim in such a manner that it constantly exerts pressure on both rims in a direction tending to hold the centering devices on the rims in snug engagement with each other.

Figure 1 of the drawings is a side elevational view of a portion of a wheel equipped with a demountable rim constructed in accordance with my invention. Fig. 2 is a horizontal sectional view taken on the line 2—2 of Fig. 1. Fig. 3 is a vertical cross-sectional view taken on the line 3—3 of Fig. 1. Fig. 4 is a detail sectional view, illustrating a slight modification; and Fig. 5 is a perspective view of the wedge-shaped locking member that retains the demountable rim in operative position.

Referring to the drawings, which illustrate the preferred form of my invention, A designates the fixed rim on the felly of the wheel, B designates the demountable rim and 1 and 2 designate coöperating projections or abutments on the outer and inner surfaces of said respective rims that prevent said rims from moving laterally with relation to each other and also hold the demountable rim centered with relation to the fixed rim, said projections 1 and 2 preferably consisting of blocks having oppositely-inclined faces that bear upon each other when the demountable rim is in operative position, and thus limit the circumferential movement of the demountable rim in one direction. The blocks 2 on the demountable rim are provided with ribs, preferably of V-shape in cross-section, that fit snugly in V-shaped grooves in the outer faces of the blocks 1 on the fixed rim so as to prevent relative lateral movement of the rims.

The blocks 1 on the fixed rim are provided at their front ends with inclined faces *y* and the blocks 2 on the demountable rim are provided at their rear ends with oppositely-inclined faces *x*, as shown in Fig. 2. A locking device, which consists of a substantially wedge-shaped member C, is arranged horizontally between said rims between the oppositely-inclined faces *x* and *y* on two of the blocks 1 and 2, as shown in Fig. 1, the front side of said member C bearing against the rear end of one of the blocks 2 on the demountable rim and the rear side of said member bearing against the front end of the adjacent block 1 on the fixed rim located at the right of said block 2. Said locking member C is acted upon by a resilient element 3 that tends to move it transversely of the rims, so as to cause the member C to constantly exert pressure on the demountable rim and on the fixed rim in opposite directions, and thus compensate for any slight circumferential movement or stretching of either rim.

It is immaterial, so far as my broad idea is concerned, how the locking member C is combined with the resilient element that exerts pressure on same, but I prefer to use a resilient element consisting of a coiled expansion spring 3 that is arranged between the member C and an abutment member 5 carried by one of the rims. In the structure herein shown the abutment member 5, with which the spring 3 coöperates, extends transversely across the outer end of the locking member C and it is pivotally connected to the demountable rim B in such a manner that it can be swung outwardly into the position shown in broken lines in Fig. 2 when it is desired to withdraw the locking member C, preparatory to removing the demountable rim from the fixed rim. The spring 3 is preferably permanently connected to the locking member C, so that it will not become lost during the operation of changing the rim of the wheel, the member C having a recess or pocket in which the spring 3 is seated and the inner end of said spring being secured to the inner wall 4 of said pocket or recess by means of a nut 3ª, as shown in Fig. 2. The member 5 is normally held in the position shown in full lines in Fig. 2 by means of a retaining device 7 carried by one of the blocks 2 on the demountable rim B and provided with a head 7ª that engages said member 5 and retains it in the position shown in full lines in Fig. 2. The retaining device 7 is mounted in such a manner that it can be turned or rotated, and the abutment member 5 is provided at its free end with a slot 5ᵇ through which the head 7ª on said retaining device passes when the member 5 is moved into its operative position, the retaining device 7 thereafter being given a quarter turn so that the head thereon will extend crosswise of the slot 5ᵇ in the member 5, and thus securely hold the member 5 in such a position that it will act as an abutment for the spring 3. The member 5 is pivotally connected to the demountable rim B by means of a bolt 6 that passes transversely through one of the blocks 2 on said rim and which is provided at one end with a head 6ª that is arranged radially with relation to the axis of the wheel. The member 5 is provided with a sleeve-like portion that surrounds the head 6ª on the bolt 6, and at the point where said head is joined to the shank of the bolt said sleeve-like portion is cut away, as shown in Fig. 1, so as to permit the member 5 to be swung back far enough not to interfere with the removal of the locking member C. The member 5 is preferably provided at its free end with a pocket 5ª that receives the head 7ª on the retaining device 7, so as to house and protect the element 7ª that locks the abutment member in operative position.

If desired, the bottom of the pocket 5ª may be provided with a depression or other suitable means that coöperates with the head 7ª of the retaining device, so as to prevent said device from moving accidentally into such a position that it will release the element 5 that forms an abutment for one end of the spring 3 which exerts pressure on the locking member C. Various means may be employed for securing the member 5 in operative position, and while I prefer to use a manually-operable retaining device for this purpose, it would be practicable to use an automatic latching device for securing the abutment member 5 in position.

In Fig. 4 of the drawings I have illustrated an automatic latching device for the member 5 which consists of a bolt 17 in one of the blocks 2 provided with a head 17ª that coöperates with a spring-pressed latch 9 on the member 5, said latch 9 being slidingly mounted on said member and combined with a spring 10 in such a manner that it will snap under the head 17ª on the retaining device 17, and thus automatically lock the abutment member 5 when said member is moved into its closed position. A lug on the latch 9 that projects laterally through a slot in the member 5, as shown in Fig. 4, serves as a means for disengaging said latch from the part 17ª of the retaining device with which it coöperates.

The space between the rims A and B is closed by cover plates 8 arranged in the manner shown in Figs. 1, 2 and 3, one of said cover plates being preferably connected to the demountable rim and the other to the fixed rim or to the felly of the wheel on which the fixed rim is mounted.

To arrange the remountable rim in operative position it is first slipped sidewise over the fixed rim and then moved circumferentially to the left, looking at Fig. 1, so that the blocks 2 on the inner side of same will engage the coöperating blocks 1 on the periphery of the fixed rim. The locking member C is then inserted between said rims so that it will engage the rear end of one of the blocks 2 on the demountable rim and the front end of the adjacent block 1 to the right, on the fixed rim. Thereafter, the abutment member 5 is swung inwardly into the position shown in full lines in Fig. 2 and locked in position by giving the retaining device 7 a quarter turn, so that the head on the outer end of same will bear upon the free end of said abutment member 5. If the rim is provided with a retaining means of the kind illustrated in Fig. 4 the abutment member 5 will be locked automatically when it reaches its closed or operative position.

A demountable rim of the construction above described can be applied and removed quickly, and it is exceptionally strong and rigid, owing to the fact that the coöperating projections on the periphery and on the inner side of the fixed rim and demountable rim, respectively, are held in engagement with each other by a rugged locking device of block form that is arranged between two of said projections. Any slight circumferential play or movement that develops between the rims or any stretching of the rims is compensated for or taken up automatically by the spring-actuated locking member C, which constantly exerts pressure on the two rims in opposite directions; consequently, there is no danger of the demountable rim working loose or rattling when it is in use. The space between the rims in which the coöperating projections on the rims are located is closed by the cover plates 8, thereby preventing dirt and foreign matter from becoming packed in said space and interfering with the removal of the demountable rim, and the locking member C is completely protected by the abutment member 5 which practically forms part of one of the cover plates that prevents dirt from entering the open space between the rims. When the abutment member 5 is in operative position, as shown in full lines in Fig. 2, it is locked securely by a retaining device which is so arranged that the force of the spring 3 that acts on the locking member C also tends to hold the head of said retaining device snugly in engagement with the abutment member 5. In addition to the desirable features above mentioned, a rim of the construction above described can be applied and removed quickly, in view of the fact that only a single locking member is employed for locking the demountable rim in position.

Having thus described my invention, what I claim, and desire to secure by Letters Patent, is:

A wheel, comprising a fixed rim, a demountable rim surrounding said fixed rim, coöperating means on said rim that hold the demountable rim centered and limit the circumferential movement of same in one direction, a substantially wedge-shaped removable locking member arranged between said rims in engagement with oppositely-inclined surfaces thereon, a cover plate rigidly secured to each of said rims and extending entirely around the same that prevents dirt from accumulating in the open space between said rims, one of said cover plates having a laterally movable portion, and a spring interposed between said movable portion and said locking member.

In testimony whereof I hereunto affix my signature in the presence of two witnesses, this fifth day of May 1915.

NICHOLAS SCHENK.

Witnesses:
WELLS L. CHURCH,
GEORGE BAKEWELL.

Copies of this patent may be obtained for five cents each, by addressing the "Commissioner of Patents, Washington, D. C."